(12) United States Patent
Tam

(10) Patent No.: US 8,610,052 B2
(45) Date of Patent: Dec. 17, 2013

(54) TESTING AN INFRARED PROXIMITY SENSOR

(75) Inventor: Ching Yu John Tam, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 320 days.

(21) Appl. No.: 13/051,847

(22) Filed: Mar. 18, 2011

(65) Prior Publication Data

US 2012/0235029 A1 Sep. 20, 2012

(51) Int. Cl.
*G01J 5/02* (2006.01)

(52) U.S. Cl.
USPC ..................................... 250/252.1

(58) Field of Classification Search
USPC ..................................... 250/252.1
See application file for complete search history.

(56) References Cited

U.S. PATENT DOCUMENTS

| | | | |
|---|---|---|---|
| 5,093,656 A | 3/1992 | Dipoala | |
| 5,093,735 A | 3/1992 | Doane et al. | |
| 5,596,450 A * | 1/1997 | Hannon et al. | 359/599 |
| 6,437,857 B1 | 8/2002 | Stockton | |
| 2009/0100903 A1* | 4/2009 | Porjo | 73/1.88 |

FOREIGN PATENT DOCUMENTS

| | | |
|---|---|---|
| DE | 3429410 A1 * | 2/1986 |
| DE | 3801381 | 8/1989 |
| JP | 2002214039 A * | 7/2002 |

OTHER PUBLICATIONS

Translation of DE 3429410 A1.*
Translation of JP 2002-214039 A.*
"Low Power Ambient Light and Proximity Sensor with Intelligent Interrupt and Sleep Modes", ISL29029, Intersil™, Nov. 23, 2010, FN7682.0, (pp. 1-16).
Kobayashi, Junya, et al., "The IR Modulator Utilizing Light Scattering Effect with . Ferroelectric Liquid Crystal for Gas Analysis", International Journal of Infrared and Millimeter Waves, vol. 17, No. 7, 1996, (pp. 1149-1163).
McCargar, James W., et al., "Polymer Dispersed Liquid Crystal Infrared Light Shutter", Journal of Electronic Imaging, Jan. 1992, vol. 1(1), (pp. 22-28).

* cited by examiner

*Primary Examiner* — Constantine Hannaher
(74) *Attorney, Agent, or Firm* — David C. Kellogg

(57) ABSTRACT

A system for testing an IR proximity sensor has an infrared reflector that receives radiation transmitted from the proximity sensor under test. An electronically modulated IR-transmissive device is positioned between the sensor and the reflector. A tester is coupled to control the IR-transmissive device for testing the sensor. Other embodiments are also described and claimed.

20 Claims, 5 Drawing Sheets

US 8,610,052 B2

TESTING AN INFRARED PROXIMITY SENSOR

BACKGROUND

A proximity sensor is a sensor that is able to detect the presence of nearby objects without any physical contact. One particular type of proximity sensor emits a beam of electromagnetic radiation in the infrared spectrum, and detects changes in the field or return signal. The object being sensed may be referred to as the proximity sensor's target. To test such a sensor, a target is selected that has sufficient reflection characteristics in the infrared spectrum used by the sensor. The target is then placed at different distances from the sensor, while measuring the output of the sensor. As the target is moved farther away, the output of the sensor drops. Typically, the sensor is tested at several different target distances, and if its output falls outside an expected range for each target distance, then the sensor may be deemed a failing unit.

While the proximity sensor has long had several applications, its relatively recent use in personal mobile communications devices such as cellular phones and smart phones that have a touch sensitive display screen presents a particularly difficult challenge for its high volume manufacture testing. Smart phones such as the iPhone™ device by Apple Inc. use a proximity sensor to detect when the user has moved the device to her ear during a call, and on that basis may decide to disable any input from a touch screen to avoid inadvertent touch commands being entered due to contact with the user's cheek. Quality control may call for each specimen of such a smart phone device to be tested prior to sale. Since a relatively large number of such specimens may need to be released to end users over a short time interval, for example every day, a more efficient test methodology for testing the proximity sensor is needed.

SUMMARY

An embodiment of the invention enables the testing of a proximity sensor without requiring a sensor target to be moved relative to the device under test, in order to check the response of the sensor to different target distances. A system for testing an infrared proximity sensor includes an infrared reflector that receives radiation transmitted from the proximity sensor, and an electronically modulated infrared transmissive (EMIRT) device that is positioned between the sensor and the reflector. A tester is coupled to control the EMIRT device for testing the sensor. The tester changes the infrared absorption characteristics of the EMIRT device, while the sensor is operating and the EMIRT device and the reflector remain in their fixed positions. Output data from the sensor is collected while the sensor is operating (and the infrared absorption characteristics of the device are changing). The collected output data is compared to expected data to determine whether or not the proximity sensor has passed a target object distance test. As an example, the EMIRT device may include an array of liquid crystal elements that are controlled by the tester to achieve variable attenuation of the infrared radiation that is passing through the array. Such a system may be more cost effective and may be faster than a conventional proximity sensor test system in which the test target needs to be automatically moved to different distances.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
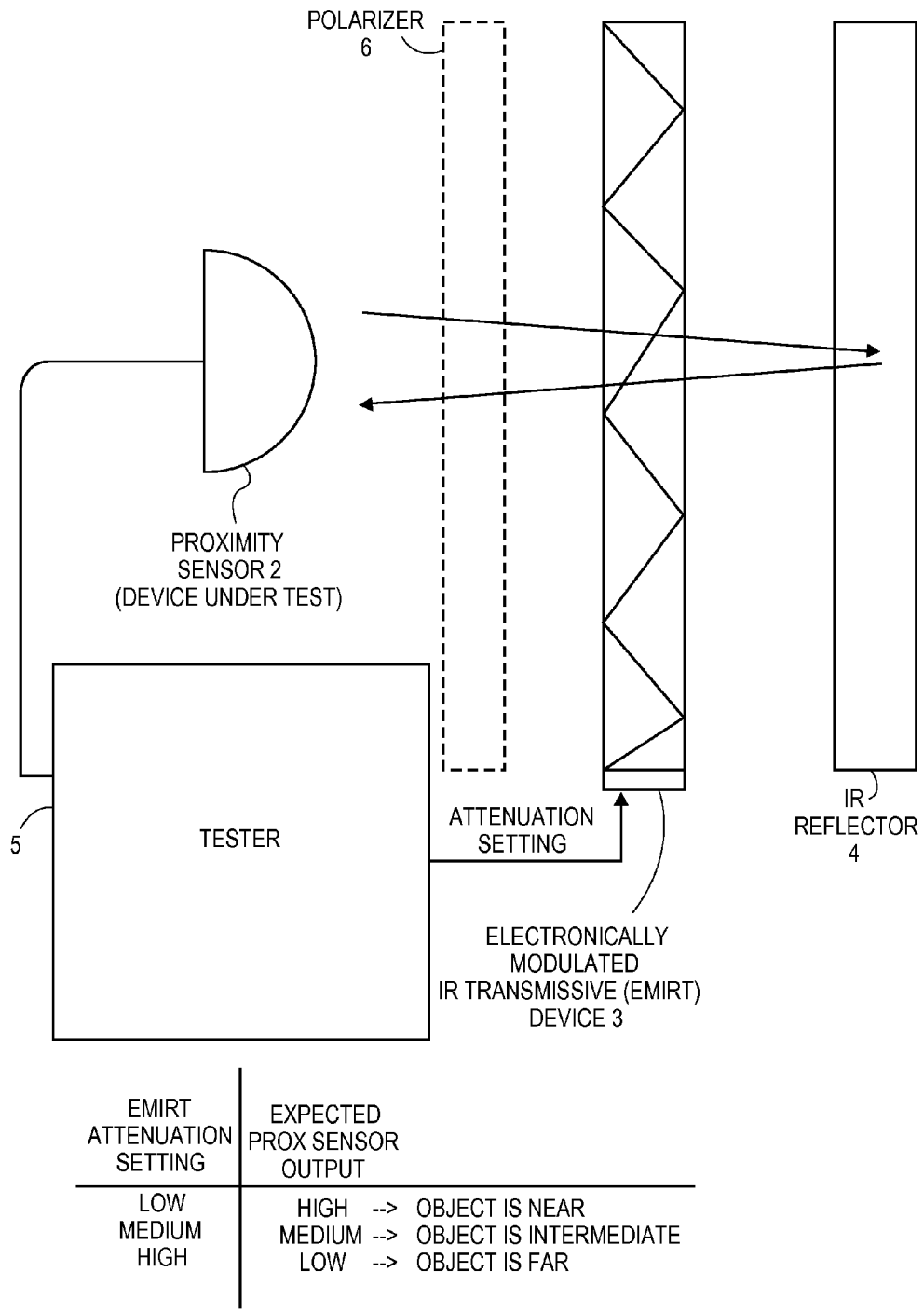
FIG. 1 is a block diagram of a system for testing a proximity sensor, in accordance with an embodiment of the invention.

FIG. 1 is a block diagram of a system for testing a proximity sensor, in accordance with an embodiment of the invention. A proximity sensor 2, also referred to here as a device under test or DUT, encompasses an infrared emitter and a counterpart infrared detector (both not shown) whose functionality is to be verified by the test methodology described here. The proximity sensor 2 may be a single discrete integrated circuit package, or it may be part of a group of several such sensors within a larger device, such as a multifunction display and proximity sensing panel. In one embodiment, the detector and the emitter are different physical components that are installed into an assembly (which assembly may also be referred to as the DUT). The proximity sensor 2 may also have a built-in digital communications interface that provides a digital output value (based on having digitized an analog signal from an analog detector). Also, although not shown explicitly in FIG. 1, the proximity sensor 2 may be integrated into a larger "host" device, such as a consumer electronics mobile communications device (see FIG. 3 described below). The proximity sensor 2 transmits infrared (IR) radiation, for example in a band centered around 850 nanometers and/or 950 nanometers, and this radiation after being scattered or reflected by a target is sensed by the detector. This is shown in FIG. 1 by the outgoing and incoming arrows between the sensor 2 and an IR reflector 4.

The IR reflector 4 is positioned to receive the radiation transmitted from the proximity sensor 2 to and scatter or reflect some of that radiation back towards the proximity sensor 2 as shown. The reflector 4 may be flat or somewhat curved, and may have a diffuse reflection characteristic or it may have a somewhat specular reflection characteristic. In most instances, the IR reflector 4 remains fixed relative to the DUT, during the entire duration of the test process.

Positioned between the proximity sensor 2 and the IR reflector 4 is an electronically modulated IR-transmissive (EMIRT) device 3. The EMIRT device 3 is located in a light path of the infrared radiation that is emitted or being received by the proximity sensor 2. It may also remain fixed relative to the DUT, during the entire duration of the process. In the embodiment depicted in FIG. 1, the EMIRT device 3 passes not just the emitted radiation but also, in the reverse direction, the reflected or scattered radiation. See FIG. 4 and FIG. 5 for other embodiments of the invention where the EMIRT device 3 is positioned so as to pass only either the transmitted or the reflected radiation, but not both.

The EMIRT device 3 passes the infrared radiation used by the proximity sensor 2, but does so in accordance with variable attenuation under control of a tester 5. It may also be described as a variable IR attenuator. The EMIRT device 3 may be made of an array of liquid crystal elements, and an associated controller that provides a digital control interface to the tester 5 for receiving an attenuation setting. The liquid crystal elements may be part of a liquid crystal display (LCD) panel or screen that does not have a backlight or light source installed therein. Conventional LCD panels have a backlight or light source that is used to light up the elements of the LCD panel; for use as part of the EMIRT device 3, the backlight or light source should be absent so that the panel acts as a variable IR attenuator.

The EMIRT device 3 is electronically modulated or controlled in accordance with an attenuation setting that has been provided by a tester 5. The tester may be a hardwired state machine or sequencer that signals the EMIRT device 3 to be sequentially configured in accordance with a number of different attenuation settings, while at the same time collecting output data of the proximity sensor 2 and associating such data with each attenuation setting. As an alternative to a hardwired state machine or sequencer, a programmed computer (processor and memory containing software that is designed to control the EMIRT device 3 in a similar manner) may be used. In either case, the tester 5 is to control the EMIRT device 3 in a manner that simulates a target (for the proximity sensor 2) at different distances. The tester 5 may include a stored, predetermined data structure that relates a range of expected proximity sensor output values, which may represent a corresponding range of proximity sensor target distances, to a range of attenuation settings for the EMIRT device 3. This is depicted by example in FIG. 1 as a table of two columns, one containing attenuation settings and the other containing the associated proximity sensor outputs. For instance, there may be three EMIRT attenuation settings defined in the distance-attenuation data structure, e.g. low, medium and high as depicted in FIG. 1. At the low attenuation setting, the expected output of the proximity sensor will be "high", which translates into the target being near. At the other end of the scale, when the attenuation setting is high, the expected output of the proximity sensor is "low", representing the target being far. The medium attenuation setting corresponds to the situation where the target is in between or intermediate to the near and far positions. Using such a data structure, the proximity sensor 2 may be tested by, in essence, simulating a target at different distances, but without actually requiring a target that moves in relation to the proximity sensor. The IR reflector 4 and the EMIRT device 3 may be fixed in position relative to the proximity sensor 2, while the entire test is performed, because the tester 5 can control the EMIRT device 3 by adjusting its infrared absorption characteristics to thereby adjust the strength of the reflected infrared radiation that impinges on the sensor.

It may be that for certain types of EMIRT devices, such as LCD panels, an infrared light polarizer 6 may be needed to impart any required polarization to the infrared light that is passed through the LCD panel. An example of this is also depicted in FIG. 1.

Figure 2:
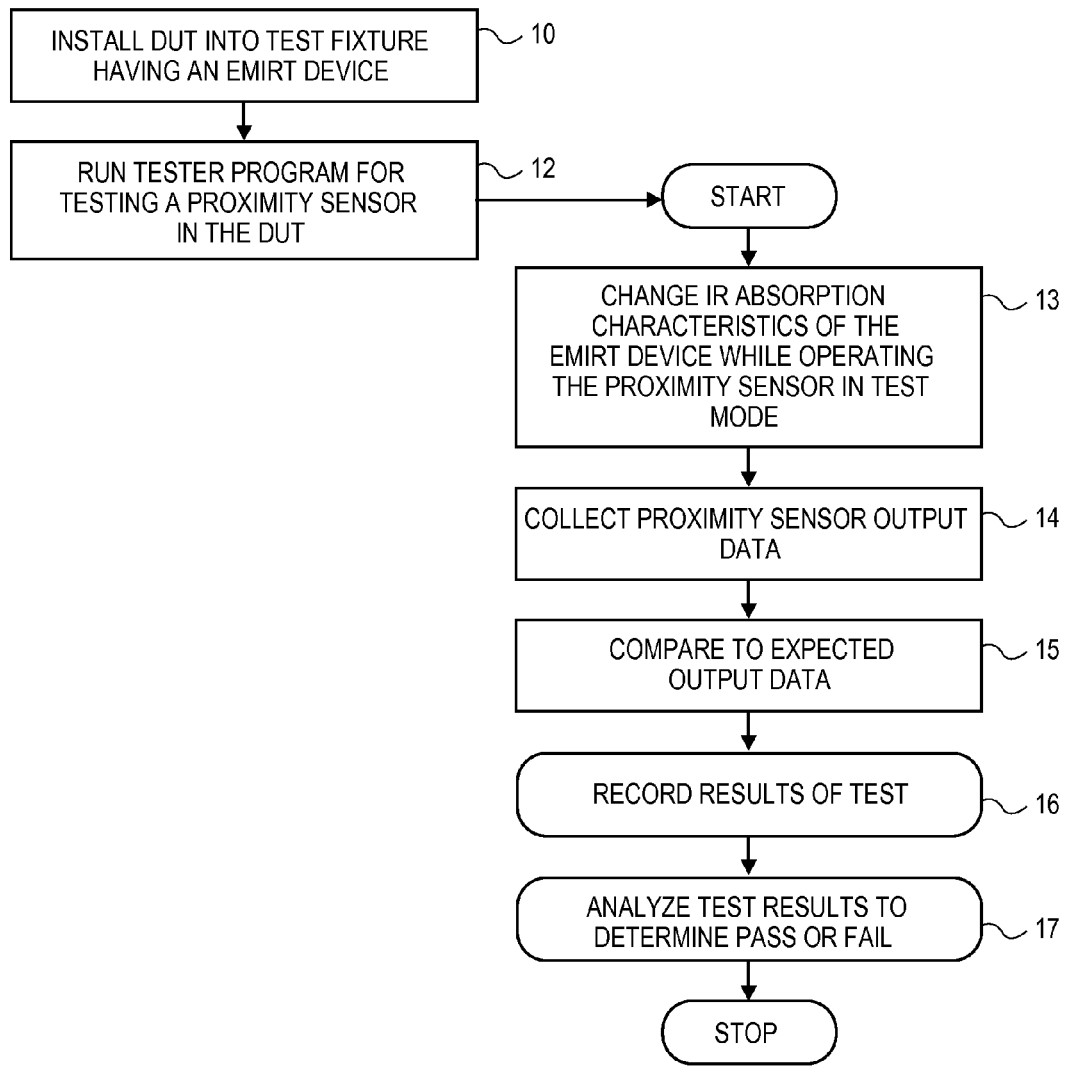
FIG. 2 is a flow diagram of a processor for testing a proximity sensor.

Referring now to FIG. 2, a flow diagram of a process for testing a proximity sensor is shown. Operation may begin with installing the DUT into a test fixture that contains an EMIRT device (block 10). The DUT can be any device that has an IR proximity sensor that transmits IR radiation and detects reflected IR radiation from a reflector in the test fixture. A tester program may then be run for testing the proximity sensor (block 12). The tester program runs by changing the IR absorption characteristics of the EMIRT device, while it operates the proximity sensor in a test mode (block 13). In other words, the IR absorption characteristics of a device that is positioned in a light path between the DUT and the reflector are changed, while the sensor is operating. The IR absorption characteristics may be changed by signaling a number of different light attenuation settings to the EMIRT device (while the proximity sensor is operating). As explained above, the tester may be a simple hardwired sequencer or it may be a programmed processor such as part of a test computer. The IR absorption characteristics may be changed through a digital control interface that can be manipulated by the tester program.

As the IR absorption characteristics are being changed, the proximity sensor is operated to collect proximity sensor output data from it (block 14). Such data may be stored and compared to previously stored, expected output data (block 15). The expected output data for the DUT may be obtained empirically by testing a sample DUT, within a laboratory setting as explained below in connection with FIG. 6. The results of the test process in FIG. 2, including the comparison between the expected output data and the collected output data, may be recorded (block 16). These test results may then be analyzed to determine whether the DUT has passed or failed the test (block 17). For instance, if the test results indicate that the collected output data remains within a predefined tolerance or margin of the expected output data for all of the different IR absorption characteristics (or EMIRT device settings), then it may be assumed that the DUT has passed the test. It should be noted that the proximity sensor output data in block 14 may be first collected by a small test program running in the DUT itself. For instance, in the case where the DUT is a consumer electronic mobile communications device, such as a mobile phone handset, tablet computer, a notebook, or laptop computer, there is sufficient processing and data storage capability within the DUT, and access to control and read the proximity sensor, for running a test program. In fact, the other operations in blocks 15-17 may also be performed by a DUT-resident test program (and then reported to the tester which may be running an external, "master" tester program, via a wireless communication link such as a Bluetooth connection).

Figure 3:
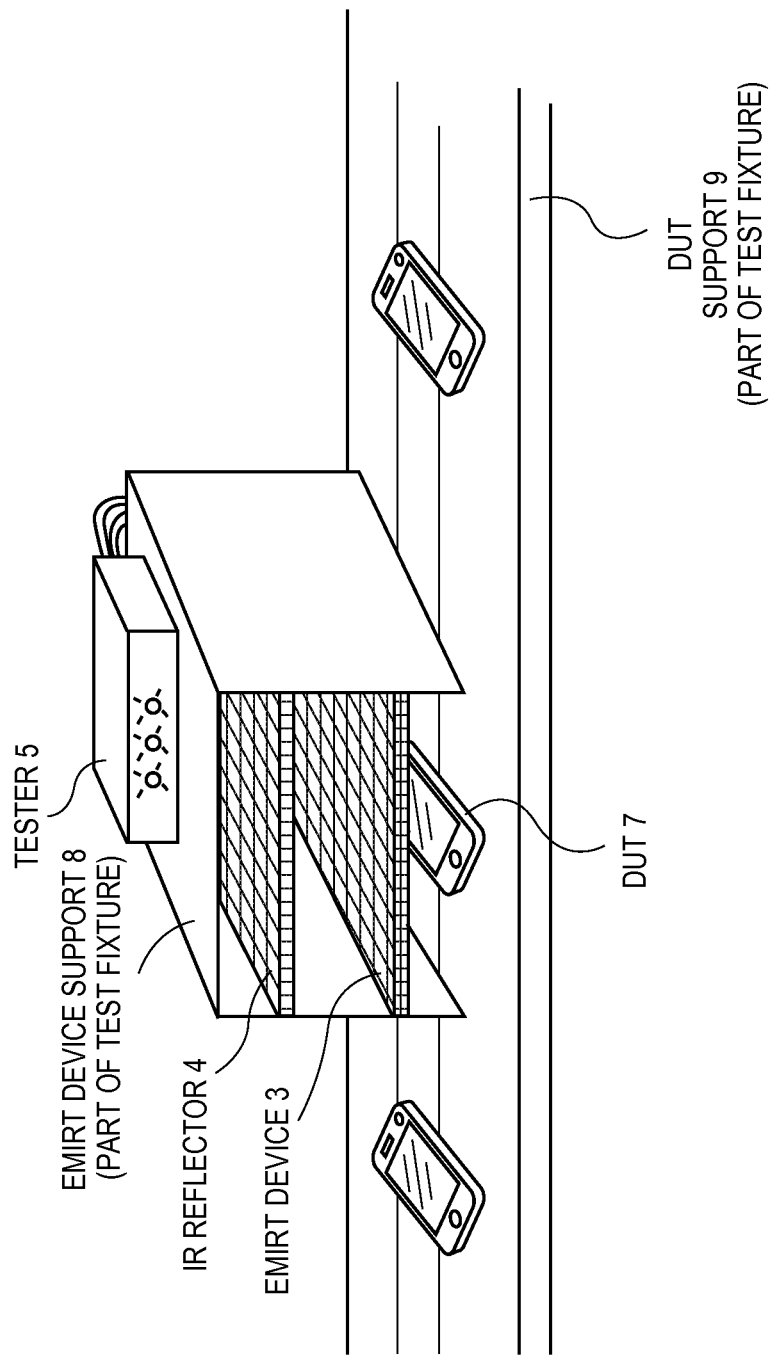
FIG. 3 shows an example proximity sensor test system.

FIG. 3 shows an example proximity sensor test system, in accordance with an embodiment of the invention. The system may be part of a high volume manufacturing production test line for a DUT 7 being, in this case, a mobile communications handset device. The system has a DUT support 9, which allows the DUT 7 to be positioned in a predetermined fixed distance from an EMIRT device support 8. The EMIRT device support 8 and the DUT support 9 may be deemed part of the test fixture in this case. The EMIRT device support 8 may have an enclosure in which are installed an IR reflector 4 and an EMIRT device 3 (in the manner described above in connection with FIG. 1 for instance). The DUT support 9, in this case includes a type of conveyor belt that moves the DUT 7 into position, underneath the EMIRT device support 8 as shown, while a tester 5 is running the tester program. The tester 5 may be a test computer that is coupled to control not just the EMIRT device 3 (to achieve variable attenuation of the IR radiation from the reflector 4), but also control the movement of the conveyor belt on which a sequence of specimens of the DUT 7 are being carried through the test fixture one at a time. The tester 5 will access a distance-attenuation setting data structure that contains a range of attenuation settings for the EMIRT device 3, when controlling the latter to verify that the proximity sensor within the DUT 7 can correctly detect a target object at different distances. This may be achieved by not having to move the IR reflector 4 and the EMIRT device 3 during the test process. In this case, the DUT 7 may have a wireless communications link to the tester 5 (e.g., a Bluetooth connection), enabling it to transfer output data that it has collected from its integrated proximity sensor to the tester 5 for comparison against expected data (found in the data structure). Other mechanisms for collecting and evaluating the proximity sensor output data, including one where all of the analysis (including the comparisons with expected data) is performed within the DUT 7, are possible.

Figure 4:
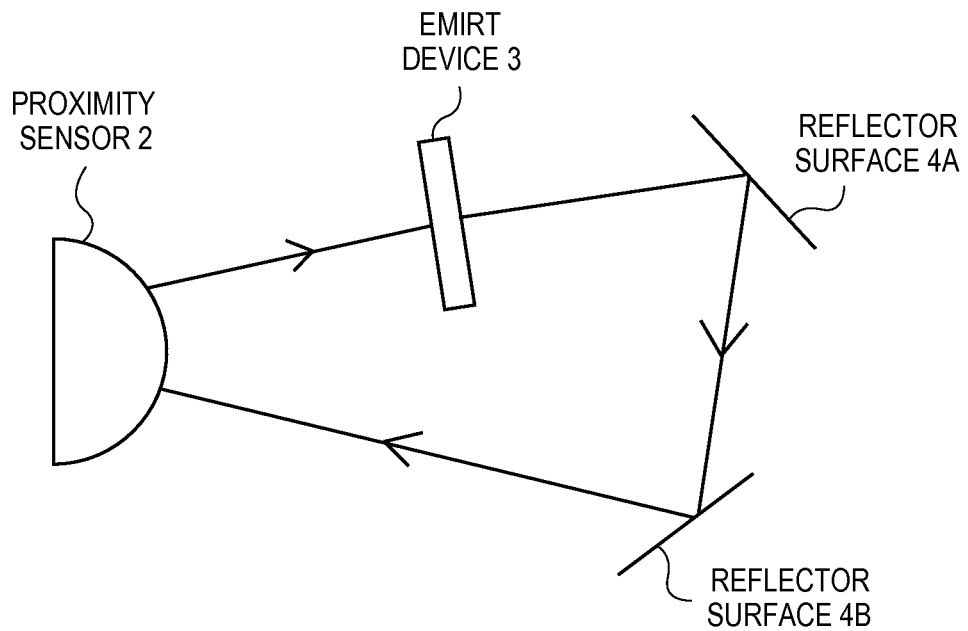
FIG. 4 is a diagram of a proximity sensor light path in one embodiment of the invention.
Figure 5:
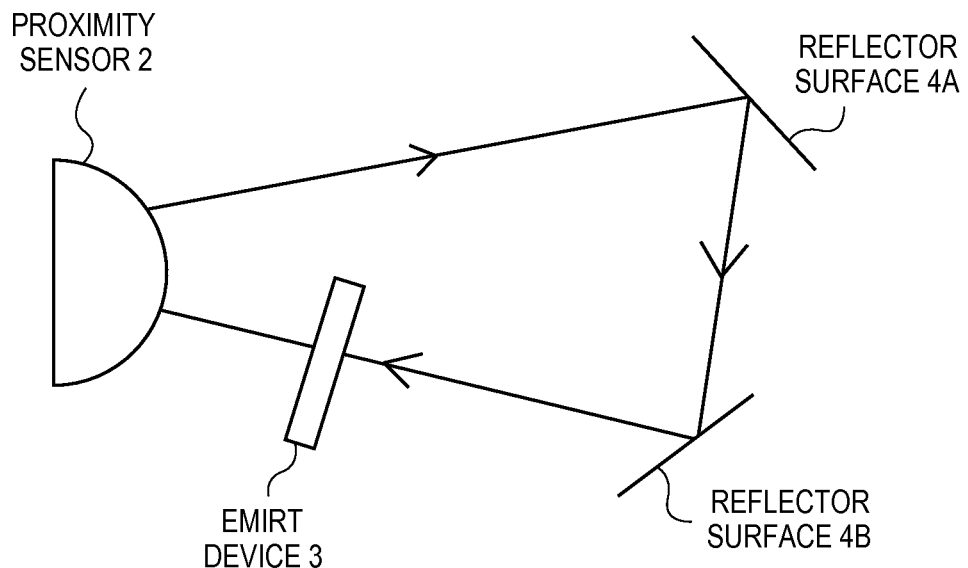
FIG. 5 is a diagram of a proximity sensor light path in another embodiment of the invention.

As suggested above, in the embodiment of FIG. 1 and also FIG. 3, the EMIRT device 3 may be positioned to pass both the transmitted IR radiation and the reflected IR radiation. There, a single IR reflector 4 is in line with both the proximity sensor and the EMIRT device 3. FIG. 4 depicts a slightly different arrangement for the proximity sensor light path, which may be used in another embodiment of the invention. In that case, the EMIRT device 3 is positioned to pass the transmitted IR radiation and not any reflected IR radiation. This is obtained through the use of two reflector surfaces 4A and 4B, where the EMIRT device 3 is between the proximity sensor 2 and the reflective surface 4A and the light path continues from the latter onto the reflector surface 4B (before impinging on the detector). Similarly, in FIG. 5, the EMIRT device 3 is positioned to pass the reflected IR radiation but not the transmitted radiation, by virtue of being positioned between reflector surface 4B and the detector (proximity sensor 2). Other arrangements for the EMIRT device 3 and reflector 4 may be possible.

Figure 6:
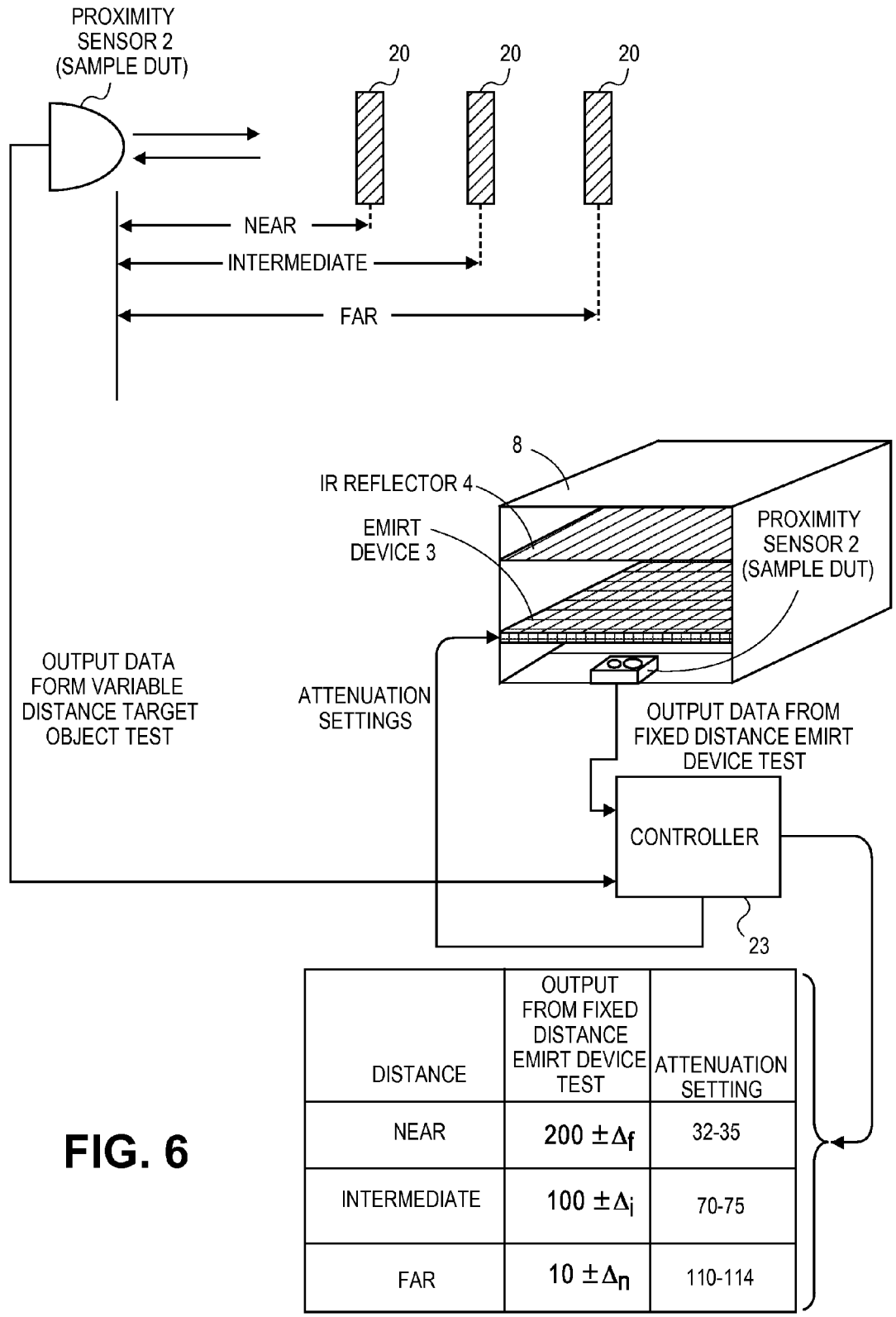
FIG. 6 shows how a distance-attenuation data structure (for use by the proximity sensor test system) can be derived.

Having described a proximity sensor test system, FIG. 6 shows how a distance-attenuation data structure for use by the test system can be derived. This arrangement also enables a method for calibrating the test system and in particular the test fixture (including EMIRT device support 8 and the IR reflector 4 and EMIRT device 3 therein). The calibration process may proceed by placing a proximity sensor target object 20 at several different distances from a sample DUT (containing the proximity sensor 2). As shown in FIG. 6, there may be near, intermediate, and far positions for the target object (relative to the proximity sensor 2). The proximity sensor 2 is then operated to detect the target object at each of the different distances, while output data of the sensor is collected. This is referred to here as output data from the variable distance target test. This proximity sensor output data is fed to a controller 23. The latter may be a programmed processor that will be used to generate the distance-attenuation data structure as follows.

Once the proximity sensor output data from the variable distance target test has been collected and provided to the controller 23, the sample DUT is installed into the test fixture as shown. The test fixture in this case includes an EMIRT device support 8 containing an EMIRT device 3 located between the sample DUT and the IR reflector 4. The controller 23 then signals a number of different settings to the EMIRT device 3 in sequence, while the proximity sensor 2 is operating as installed in the test fixture. The attenuation settings are changed in this way until the collected output data from the variable distance target object test is substantially reproduced by the sample DUT. The latter output data is referred to as fixed distance EMIRT device test output data. At this point, the correct attenuation setting has been found that produces the essentially the same output data (from the proximity sensor 2) for the fixed distance EMIRT device test as was obtained for the variable distance target object test. This may be repeated for each of the three target distances, and their corresponding attenuation settings may then be stored as part of the distance-attenuation setting data structure.

The discovered attenuation settings (that resulted in the collected output data from the variable distance target object test being reproduced by the fixed distance EMIRT test) are then associated with respective values of either the collected variable distance target object test output data or the output data from the fixed distance EMIRT device test, or both. This association may be in the form of a table or other table-type relationship, as depicted in FIG. 6. Note that the near, intermediate, and far distances are just examples, and there may be as few as two different distances or more than three different distances (for which the associated attenuation settings are determined). The test system (including a tester 5 in which the distance-attenuation table is stored) may now be deemed calibrated and ready to test specimens of the sampled DUT.

To be clear, the testing of the production specimens of the sample DUT proceeds in the manner described above in connection with FIG. 1 and FIG. 2, where the distance-attenuation setting data structure provides the expected output data that is used in the comparison operation (FIG. 2, block 15). In other words, the tester 5 is configured with the distance-attenuation setting data structure (whose values were measured as in FIG. 6), thereby enabling the tester 5 to control the EMIRT device 3 in the test fixture (e.g., see FIG. 3), in accordance with the recorded attenuation settings, and evaluate collected output data from each specimen.

It should be noted that the output data from the fixed distance EMIRT device test, or the output data from the variable distance target object test, that is associated with the respective attenuation settings, may be provided with respective practical tolerance or margin values as shown in FIG. 6 (hence the use of the term "substantially" or "essentially" above).

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although the distance-attenuation data structures depicted in FIG. 1 and in FIG. 6 have three different settings, a DUT may be tested with as few as two different settings, or more than three different settings. The description is thus to be regarded as illustrative instead of limiting.

What is claimed is:

1. A system for testing an infrared (IR) proximity sensor, comprising:
   an infrared reflector to receive radiation transmitted from the proximity sensor;

an electronically modulated IR-transmissive (EMIRT) device to be positioned between the sensor and the reflector; and a tester coupled to control the EMIRT device for testing the sensor.

2. The system of claim 1 wherein the tester is to control the EMIRT device in a manner that simulates a target object at different distances from the sensor.

3. The system of claim 1 wherein the tester comprises a stored, predetermined data structure that relates a range of expected proximity sensor output values to a range of attenuation settings for the EMIRT device.

4. The system of claim 1 wherein the EMIRT device comprises an array of liquid crystal elements.

5. The system of claim 4 wherein the tester controls the EMIRT device by adjusting the IR absorption characteristics of the array of liquid crystal elements.

6. The system of claim 4 further comprising a light polarizer positioned between the sensor and the EMIRT device.

7. A system for testing a proximity sensor, comprising:
a support for a device under test (DUT), the DUT having a proximity sensor to transmit infrared (IR) radiation;
an IR reflector positioned relative to the support to reflect the IR radiation;
an electronically modulated IR-transmissive (EMIRT) device positioned between the support and the reflector to pass the IR radiation; and
a tester computer coupled to control the EMIRT device to achieve variable attenuation of the IR radiation that is passing through the EMIRT device.

8. The system of claim 7 wherein the EMIRT device is positioned to pass both the transmitted IR radiation and the reflected IR radiation.

9. The system of claim 7 wherein the EMIRT device is positioned to pass one of the transmitted IR radiation and the reflected IR radiation, but not both.

10. The system of claim 7 wherein the EMIRT device comprises an array of liquid crystal elements that are controlled by the test computer to achieve the variable attenuation of the passing IR radiation.

11. The system of claim 7 wherein the tester computer is to access a data structure that contains a range of attenuation settings for the device, when controlling the EMIRT device to verify that the proximity sensor can correctly detect a target object at different distances.

12. The system of claim 7 further comprising a light polarizer positioned between the sensor and the EMIRT device.

13. A method for testing an infrared proximity sensor, comprising:
installing a device under test (DUT) into a test fixture, the DUT having an infrared (IR) proximity sensor to transmit IR radiation and detect reflected IR radiation, the test fixture having an IR reflector to produce the reflected IR radiation; and changing IR absorption characteristics of a device that is positioned in a light path between the DUT and the reflector, while the sensor is operating.

14. The method of claim 13 further comprising:
collecting output data from the sensor while the sensor is operating and the IR absorption characteristics of the device are changing; and
comparing the collected output data to expected data to determine whether or not the proximity sensor has passed a target object distance test.

15. The method of claim 13 wherein changing IR absorption characteristics of the device comprises:
signaling a plurality of different light attenuation settings to the device, while the sensor is operating.

16. A method for calibrating a proximity sensor test fixture, comprising:
placing a target object at a plurality of distances from a device under test (DUT) containing a proximity sensor that is operating to detect the object;
collecting output data of the sensor while it is operating to detect the target object at the plurality of distances;
installing the DUT into a test fixture, the test fixture having a variable IR absorber positioned between the DUT and an IR reflector;
applying a plurality of settings to the variable IR absorber while the sensor is operating as installed in the test fixture, until the collected output data is reproduced by the sensor; and
recording the settings that resulted in the collected output data being reproduced.

17. The method of claim 16 further comprising associating the recorded settings, that resulted in the collected output data being reproduced, with the plurality of distances, respectively.

18. The method of claim 16 further comprising associating the recorded settings, that resulted in the collected output data being reproduced, with respective values of the collected output data.

19. The method of claim 16 further comprising:
configuring a tester with the recorded settings; and
enabling the tester to control the variable IR absorber in the test fixture in accordance with the recorded settings.

20. A proximity sensor test system, comprising:
means for supporting a device under test (DUT), the DUT having a proximity sensor to transmit infrared (IR) radiation;
means for reflecting the IR radiation back towards the proximity sensor;
means for passing the IR radiation with variable attenuation, between the supporting means and the reflecting means; and
means for controlling the radiation passing means to achieve variable attenuation of the IR radiation that is passing through, while recording output of the proximity sensor.

* * * * *